United States Patent [19]

Palm et al.

[11] 4,184,436
[45] Jan. 22, 1980

[54] CHIP-FIRING UNIT

[76] Inventors: Roland Palm, 346 Möbodarne; Sven Palm, 16 Krongatan, both of S-826 00 Soderhamn, Sweden

[21] Appl. No.: 901,312

[22] Filed: Apr. 28, 1978

Related U.S. Application Data

[63] Continuation-in-part of Ser. No. 713,279, Aug. 10, 1976, abandoned.

[30] Foreign Application Priority Data

Aug. 14, 1975 [SE] Sweden ............................. 7509105

[51] Int. Cl.² ............................................. F23K 3/02
[52] U.S. Cl. ................................... 110/102; 110/244
[58] Field of Search ............... 110/102, 103, 104, 110, 110/244, 264

[56] References Cited

U.S. PATENT DOCUMENTS

| | | | |
|---|---|---|---|
| 1,431,944 | 10/1922 | Glasgow | 110/104 |
| 3,824,937 | 7/1974 | Turner et al. | 110/102 |
| 3,831,535 | 8/1974 | Baardson | 110/102 |
| 3,865,053 | 2/1975 | Kolze et al. | 110/102 |

FOREIGN PATENT DOCUMENTS

53514 8/1937 Denmark .
223167 10/1968 Sweden .

*Primary Examiner*—Kenneth W. Sprague
*Attorney, Agent, or Firm*—Haseltine, Lake & Waters

[57] ABSTRACT

A chip-firing unit in which a chip container has a discharge attached to the container bottom to supply chips from the container to the inlet of a motor-operated fan attached to the container. The fan is connected to a chip burner and supplies the burner with chips and air drawn in by the fan. The discharge on the container is a pipe with an external thread and is rotated by the same motor which drives the fan. The other end of the discharge pipe provides an intake for the air to be mixed with chips by the discharge. The pipe, furthermore, has an interior enclosing a rod which carries a control unit for chips and air supplies to the fan. This rod is adjusted automatically by a regulator of the hot-water boiler type. Chips are continuously fed to the inlet of the fan during rotation of the pipe. One throttle is provided for controlling the air through the inlet to the pipe, and a second throttle and a regulating rod controls the chip supplied to the burner. The two throttles cooperate through the regulating rod.

4 Claims, 2 Drawing Figures

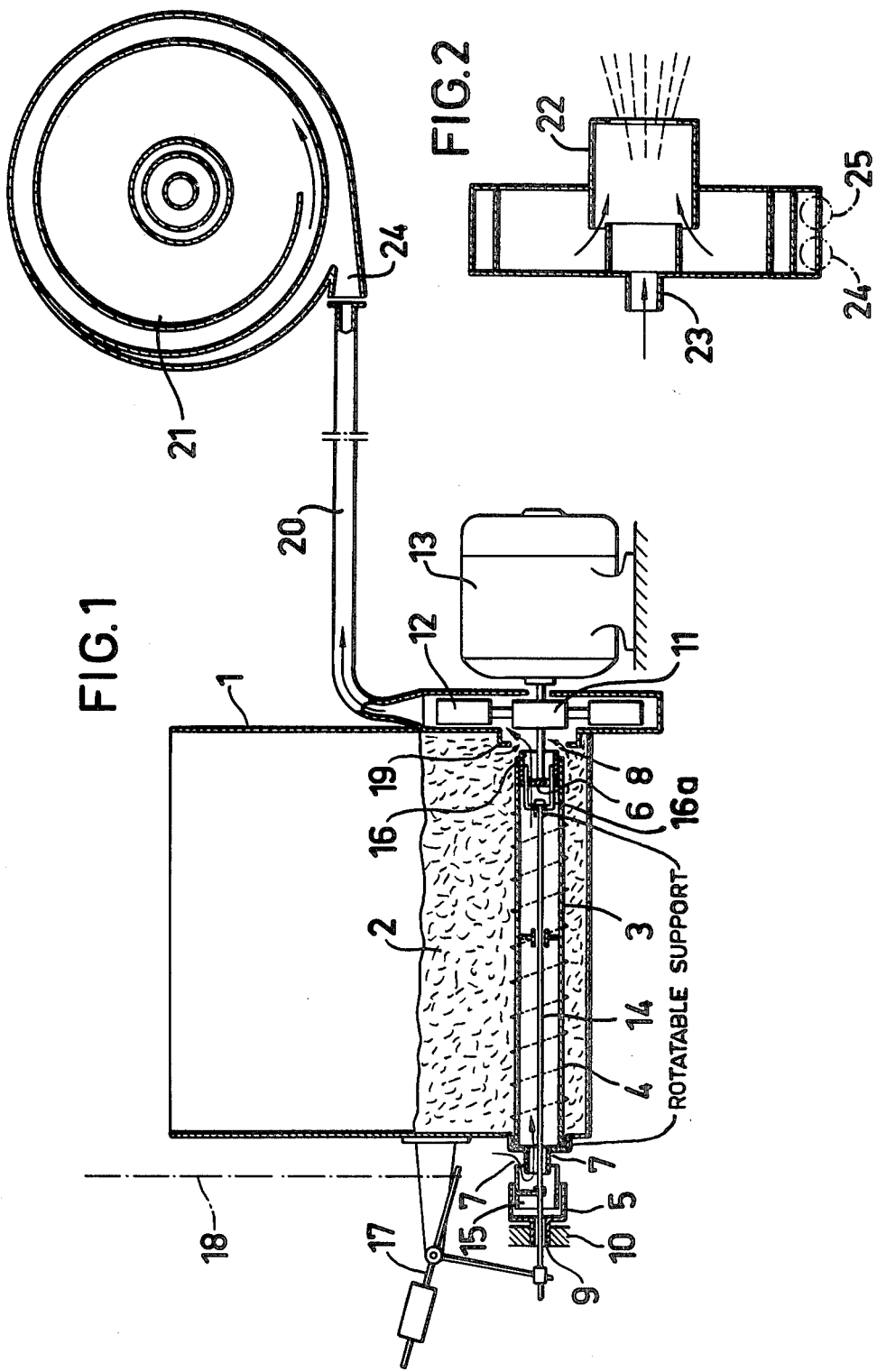

CHIP-FIRING UNIT

This application is a continuation-in-part of Ser. No. 713,279 filed Aug. 10, 1976, now abandoned.

BACKGROUND OF THE INVENTION

With the accumulation of wood chips and sawdust in lumbering operations, frequent suggestions have been made to utilize this material as a fuel in heating system, for heating water, and the like.

However, problems have been encountered, heretofore with providing the proper fuel-air ratio for efficient combustion of this fuel, to control the rate of cumbustion. Such processes, furthermore, have not been carried out in the past, at reasonable cost and without combersome equipment.

Accordingly, it is an object of the present invention to provide a chip-firing unit of the foregoing species which will assure economical combustion and make possible inexpensive production of such a unit.

Another object of the present invention is to provide an arrangement of the foregoing character which may be readily maintained in service and which has a substantially long operating life.

SUMMARY OF THE INVENTION

The objects of the present invention are achieved by providing a chip firing unit which has a chip container with a discharge means attached adjacent to the container bottom to supply chips from the container to the inlet of a motor-operated fan attached adjacent the container. This fan is connected by a conduit to a chip burner to supply the burner with chips and with air sucked in by the fan in a proportion suitably adjusted for the combustion of the chips. The discharge means preferably is a pipe with an external thread or the like and rotatable by the same motor, which drives the fan, in order at one end to feed chips into the fan inlet, while the pipe at its other end forms an air inlet so that the fan can suck in air through the pipe for mixing the air with the chips supplied by the discharge means to the fan inlet. In the pipe interior a rod may be mounted, which reciprocates in the longitudinal direction of the pipe and at its ends carries control means for the chips and the air supplied to the fan. This rod may be adjusted automatically by a usual regulator on the hot-water boiler or the like, to which the chip burner is attached. The burner preferably is a cyclone burner.

The novel features which are considered as characteristic for the invention as set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a side view of the entire chip firing unit of the present invention; and FIG. 2 is a cross-section of the cyclone burner.

DESCRIPTION OF THE PREFERRED EMBODIMENTS

The chip-firing unit shown comprises a container 1, which is intended to be filled with sawdust or the like, as indicated at 2. Adjacent the bottom of container 1 a discharge means for the chips is mounted, which at the embodiment shown consists of a rotatable pipe 3. The outer surface of the pipe is provided with a thread or the like 4, which may have been formed by winding a wire or strip with suitable pitch around the pipe 3, which thereby forms a screw conveyor of some kind. The left side of the pipe 3 is rotatably supported in the wall of the container 1. The right end of the pipe 3 is rigidly fixed and supported by the hub 11, via an end plate 6, which carries passageways—not shown—for air sucked by the fan 12 through the pipe 3. The sleeve 5 is formed at its outer end to a hollow shaft 9, which is supported in a bearing 10, while the end plate 6 is made integral with the hub 11 for a fan 12 driven by an electric motor 13 or the like disposed outside the container.

Through the pipe 3 extends a rod 14, which carries two throttles 15 and 16, respectively, in the form of annular slides fitting into the sleeve 5 and pipe 3, respectively. The first (air-) throttle 15 is rigidly fixed to the rod 14, while the second (chip-) throttle 16 is rotatably and displaceably connected to the rod 14, via a spoke member 16a. That is, the spoke member 16a is rotatably supported on the rod 14 and the throttle 16 is fixed on the spoke member 16a, which can be axially moved by the rod 14 through passages in the end plate 6.

With the arrangement described, both air and chips can be throttled with the throttles 15, 16, respectively.

The rod 14 is connected outside the bearing 10 to a lever 17 loaded by one weight, which lever is connected through a cable 18 or the like to a usual regulator on the hot-water boiler or the like to be fired with chips from the container 1. The throttle 15 preferably is adjustably mounted on the rod 14 so as to be movable along the same in one or the other direction. The container 1 preferably is provided about the fan hub 11 with an inward directed flange 19, which together with the throttle 16 defines a suitably adjusted discharge slot for the chips 2.

The fan 12 is connected on the outlet side through a conduit 20 to a burner, preferably a cyclone burner 21, to the lower surface of which the conduit 20 is tangentially connected. The cyclone burner, as shown in FIG. 2, is provided on one side with a stub 22, for inserting the burner into the fire-space of the hot-water boiler.

The cyclone burner may on its other side be provided with a secondary air inlet 23. In addition to the stub 24 for connection of the conduit 20 to the cyclone burner 21, the burner comprises a further stub indicated at 25 in FIG. 2 and intended for igniting the burner by means of a blow lamp or the like.

The chip-firing unit described operates as follows:

Upon starting the motor 13, the fan 12 rotates, and therewith rotates the pipe 3, whereby the thread 4 on the pipe advances chips as a thin layer toward the annular slot between the throttle 16 and the flange 19, so that through this slot chips are supplied to the fan inlet. The fan at the same time sucks in air through the recesses 7, which air together with the chips in question is transported by the fan 12 through the conduit 20 to the inlet 24 of the cyclone burner 21. The mixture of air and chips then passes through the helical passage 26 to the cyclone interior. After the chips have been ignited at the inner circumferential surface of the cyclone by means of the blow lamp or the like, the chips from the conduit 20 continue to be gasified and burn by themselves, and the flames emerge through the cyclone burner, as indicated in FIG. 2.

The firing of the boiler having been started in this way, a usual regulator provided on the boiler and sensitive to the boiler water temperature can control the supply of chips and combustion air to the cyclone burner by means of the cable 18 and lever 17. When, for example, a more gentle firing is required, the regulator through the cable 18 reverses the lever 17 into counterclockwise direction in FIG. 1 whereby the rod 14 is moved to the right in FIG. 1, so that the throttles 15 and 16 throttle the air and chip supply to the fan and thereby reduce the heat supply to the boiler. When the boiler water temperature becomes too low, the cable 18 returns the rod 14 so that more air and fuel are supplied to the fan and therewith to the burner. The aforementioned adjustability of the throttle 15 renders it possible to vary the proportion of air and chips to the fan, and therewith to the cyclone burner, according to demand.

The invention, of course, is not restricted to the embodiment described above and shown in the drawing, but can be realized in many other ways within the scope of the invention.

Without further analysis, the foregoing will so fully reveal the gist of the present invention that others can, by applying current knowledge, readily adapt for various applications without omitting features that, from the standpoint of prior art, fairly constitute essential characteristics of the generic or specific aspects of this invention, and therefore, such adaptations should and are intended to be comprehended within the meaning and range of equivalents of the following claims.

What we claim is:

1. A chip-firing unit comprising a burner, a container for chips, a fan with an inlet located adjacent to said container, a drive connected to said fan, a conduit, a conveyor for transportation of chips from the container to the inlet of said fan for further transportation via, said conduit to said burner, said conveyor comprising a pipe with external thread means, and being rotatably arranged and directly coupled to the fan drive, chips being continuously fed to the inlet of said fan during rotation of said pipe, the interior of said pipe communicating with the ambivalent air through an inlet to the pipe, a first throttle for controlling the air through the inlet to said pipe, a second throttle and a regulating rod for controlling the chip supply to the burner, said first throttle cooperating via said regulating rod with said second throttle.

2. A chip-firing unit according to claim 1 including rod means mounted in the interior of said pipe and reciprocatable in the longitudinal direction of said pipe, and control means for the chips and the air supplied to the fan carried at the ends of said rod means.

3. A chip-firing unit according to claim 1 including a regulator on means connected to the chip-burner for automatically adjusting said rod.

4. A chip-firing unit according to claim 1 wherein said burner comprises a cyclone burner.

* * * * *